United States Patent
Wang et al.

(10) Patent No.: US 11,314,575 B2
(45) Date of Patent: Apr. 26, 2022

(54) COMPUTING SYSTEM EVENT ERROR CORRECTIVE ACTION RECOMMENDATION

(71) Applicant: INTERNATIONAL BUSINESS MACHINES CORPORATION, Armonk, NY (US)

(72) Inventors: Qing Wang, Chappaqua, NY (US); Larisa Shwartz, Greenwich, CT (US); Jinho Hwang, Ossining, NY (US); Srinivasan Parthasarathy, White Plains, NY (US); Michael Elton Nidd, Zurich (CH); Frank Bagehorn, Dottikon (CH); Jakub Krchák, Jindrichuv Hradec (CZ); Tomás Ondrej, Prague (CZ); Altynbek Orumbayev, Prague (CZ); Michal Mýlek, Vrané nad Vltavou (CZ); Ota Sandr, Prague (CZ)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/945,954

(22) Filed: Aug. 3, 2020

(65) Prior Publication Data
US 2022/0035692 A1 Feb. 3, 2022

(51) Int. Cl.
*G06F 11/00* (2006.01)
*G06F 11/07* (2006.01)
*G06F 17/16* (2006.01)

(52) U.S. Cl.
CPC ........ *G06F 11/079* (2013.01); *G06F 11/0769* (2013.01); *G06F 17/16* (2013.01)

(58) Field of Classification Search
CPC ............... G06F 11/0769; G06F 11/079; G06F 11/0793; G06F 17/16
See application file for complete search history.

(56) References Cited

U.S. PATENT DOCUMENTS

| | | | |
|---|---|---|---|
| 10,496,463 B2 | 12/2019 | Chen | |
| 10,510,000 B1 | 12/2019 | Commons | |
| 10,831,585 B2* | 11/2020 | Gu | G06F 11/0778 |
| 11,210,160 B1* | 12/2021 | Dukhovny | G06F 11/327 |
| 2015/0019469 A1* | 1/2015 | Ioannidis | G06N 7/00 706/46 |
| 2015/0199715 A1 | 7/2015 | Caron | |
| 2016/0196174 A1* | 7/2016 | Jacob | G06F 11/0781 714/37 |

(Continued)

OTHER PUBLICATIONS

Appendix 1 to the Oct. 2019 Update: Subject Matter Eligibility (Year: 2019).*

(Continued)

*Primary Examiner* — Jonathan D Gibson
(74) *Attorney, Agent, or Firm* — Nicholas A. Welling (57) ABSTRACT

An approach to recommending corrective action to computing system event errors. The approach may include generating a textual description of an event error. The approach may include transforming the textual description into feature vectors with a domain-specific word embedding module. The approach may also include generating a recommendation to correct the event error based on an analysis of the feature vectors. Additionally, the recommendation may be presented for verification.

17 Claims, 7 Drawing Sheets

(56) References Cited

U.S. PATENT DOCUMENTS

| | | | |
|---|---|---|---|
| 2016/0350173 A1* | 12/2016 | Ahad | G06F 11/0751 |
| 2019/0324831 A1* | 10/2019 | Gu | G06F 11/0778 |
| 2019/0334759 A1* | 10/2019 | Ray | H04L 43/04 |
| 2020/0125586 A1* | 4/2020 | Rezaeian | G06F 16/285 |
| 2020/0195652 A1* | 6/2020 | Carnahan | G06N 7/005 |
| 2021/0026735 A1* | 1/2021 | Hall | G06F 16/3329 |
| 2021/0089959 A1* | 3/2021 | Ghosh | G06N 20/00 |
| 2021/0099336 A1* | 4/2021 | Li | G06K 9/6232 |
| 2021/0158171 A1* | 5/2021 | Rausch | G06F 16/25 |
| 2021/0252402 A1* | 8/2021 | Mishra | A63F 13/79 |
| 2021/0342209 A1* | 11/2021 | Kishore | G06F 40/30 |
| 2021/0382770 A1* | 12/2021 | Lu | G06F 11/079 |

OTHER PUBLICATIONS

Bouneffouf, et al., "A Survey on Practical Applications of Multi-Armed and Contextual Bandits," IBM Thomas J. Watson Research Center, Apr. 2, 2019, 8 pages, Yorktown heights, NY, USA.

Disclosed Anonymously, "A method for self diagnosis and health check to improve consumability of software components in an enterprise solution," IP.com, Oct. 1, 2015, 4 pages, IP.com No. IPCOM000243560D.

Disclosed Anonymously, "Method and System of Integrating Contextual Information with Point of Failure Information (POF) for Generating Diagnostic Information of a State of a Software System," IP.com, Aug. 25, 2010, 4 pages, IP.com No. IPCOM000199066D.

Disclosed Anonymously, "Use of Artificial Intelligence in Psychological and Psychiatric Counseling Simulation," IP.com, Feb. 13, 2020, 5 pages, IP.com No. IPCOM000261246D.

Mell, et al., "The NIST Definition of Cloud Computing", National Institute of Standards and Technology, Special Publication 800-145, Sep. 2011, 7 pages.

Shariff, et al., "Differentially Private Contextual Linear Bandits," Rightslink, 2018, 11 pages.

Slivkins, "Introduction to Multi-Armed Bandits," Sep. 30, 2019, 174 pages, Foundations and Trends in Machine Learning.

Wu, et al., "Contextual Bandits in A Collaborative Environment," 2016, pp. 529-538, University of Virginia, Charlottesville, VA USA.

Manifar et al., "Applying Particle Swarm Optimization to Improve Average Reward in non-Stationary Multi-Armed Bandit", (2018), 5 pages, <http://iieng.org/images/proceedings_pdf/3042E0114570.pdf>.

Zeng et al. ,"Online Context-Aware Recommendation with Time Varying Multi-Armed Bandit", KDD '16, Aug. 13-17, 2016, San Francisco, CA, USA, DOI: http://dx.doi.org/10.1145/2939672.2939878, 10 pages.

* cited by examiner

COMPUTING SYSTEM EVENT ERROR CORRECTIVE ACTION RECOMMENDATION

BACKGROUND OF THE INVENTION

The present invention relates generally to recommending corrective actions for errors in computing devices and more specifically, to generating corrective action recommendations for computing system event errors utilizing machine learning and artificial intelligence techniques.

Artificial intelligence has amplified the ability to utilize data. Numerous techniques and models allow for collection of data and the prediction of events based on an analysis of the collected data. Human interaction between the prediction models and users allow for increased efficacy of the prediction models through feedback of the generated predictions. Optimization techniques further increase the predictive capabilities of these models to generate responses to phenomena.

SUMMARY

Embodiments of the present disclosure include a computer-implemented method, computer program product, and a system for generating a corrective action recommendation to a computing system event error. A processor can transform a textual description of an event error into feature vectors. A processor can analyze the feature vectors. A processor can generate a recommendation to correct the event error based on analyzing the feature vectors.

The above summary is not intended to describe each illustrated embodiment of every implementation of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

The embodiments depicted and described herein recognize the benefits of diagnosing event errors in computing systems using artificial intelligence and machine learning techniques.

In an embodiment of the present invention, an event error can be received from a computing system in the form of a text description of the event error. An event error can be a condition in a computing system such as high processor usage, high memory usage, network connectivity outage, high power consumption, storage malfunctions, etc. Further, the text description can be transformed into feature vectors using a natural language processing model. The feature vectors can be analyzed with an event error diagnosis model and a recommendation to correct the event error can be predicted from the analysis based on historical knowledge of similar event errors.

Additionally, in some embodiments multiple computing systems may be monitored by an event error diagnosis engine. For example, multiple servers or a cloud-based computing system may be monitored simultaneously to detect event errors. The monitoring system may detect event errors and generate text-based descriptions of the event errors based on one or more of the following pre-existing computing system knowledge, a historical database of errors, user recommendations of previous similar system resource allocation settings, and user descriptions of previous errors.

In some embodiments, the natural language processing model may include domain specific word-embedding models to convert the text description into feature vectors (e.g. GLoVe, Word2Vec, bag-of-words, skip-gram, etc.).

In another aspect of some embodiments, the generated feature vectors can be analyzed using a contextual bandit model to generate a recommendation to correct the event error. Contextual in regard to the bandit model means at least the error description which has been quantified into feature vectors by natural language processing capabilities. Additionally, a contextual bandit model is a model which attempts to solve the explore-exploit dilemma, where a reward for a certain action (i.e. recommendation) is known, however, there is still an unknown reward for another action (i.e. additional recommendation).

Further, in some embodiments the contextual bandit model can be optimized using a particle swarm optimization technique. A particle swarm optimization technique that attempts to optimize the solution of a problem iteratively by using a plurality of candidate solutions (particles) which search for the best local minimum within a search space.

In describing embodiments in detail with reference to the figures, it should be noted that references in the specification to "an embodiment," "other embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, describing a particular feature, structure or characteristic in connection with an embodiment, one skilled in the art has the knowledge to affect such feature, structure or characteristic in connection with other embodiments whether or not explicitly described.

Figure 1:
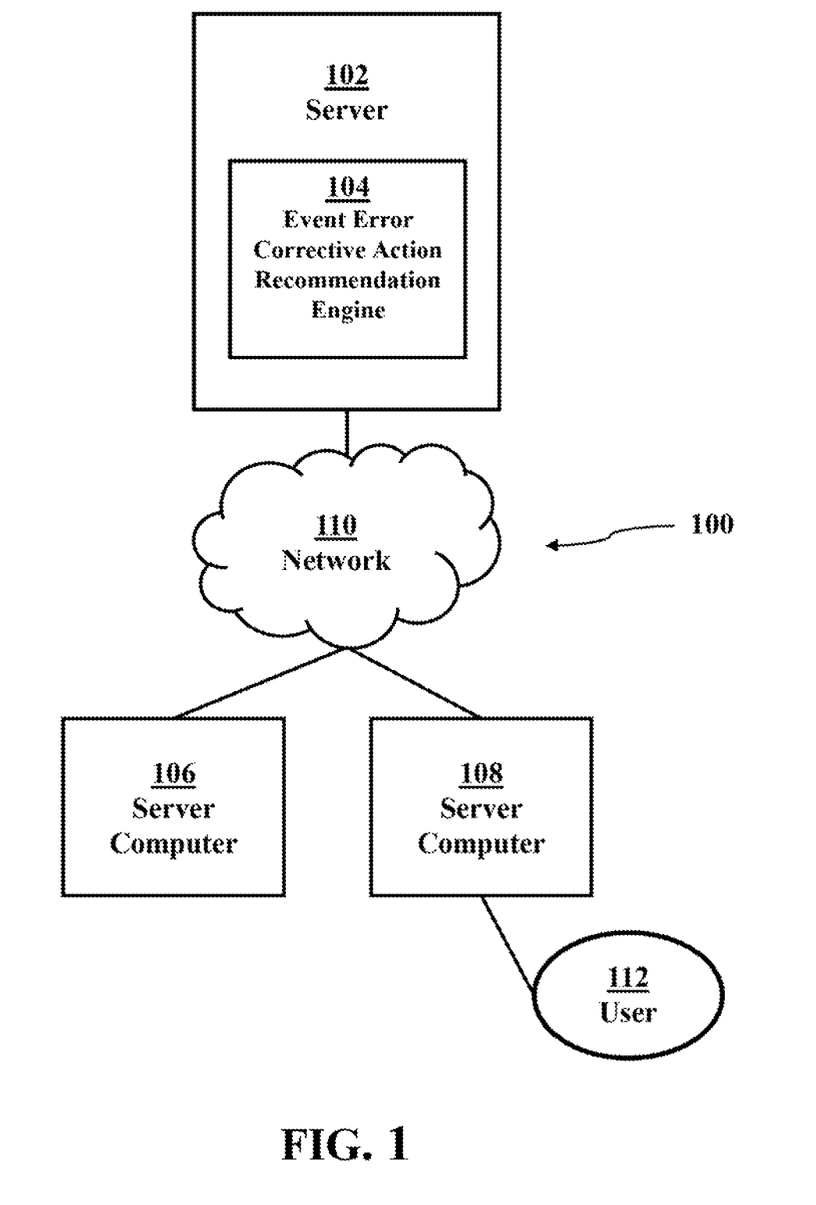
FIG. 1 is a functional block diagram generally depicting a computing system event error corrective action recommendation generation environment 100, in accordance with an embodiment of the present invention.

FIG. 1 is a functional block diagram depicting, generally, a computing system event error corrective action recommendation generation environment 100. Computing system event error corrective action recommendation generation environment 100 comprises an event error diagnosis engine 104 operational on a server 102, servers 106 and 108, and network 110 supporting communications between the servers 102, 106, and 108. As shown in FIG. 1, user 112 can access the event error corrective action recommendation engine 104 via server 108. However, user 112 can access event error corrective action recommendation engine 104 via any suitable computing device in communication with event error corrective action recommendation engine 104.

Servers 102, 106, and 108 can be a standalone computing device, a management server, a web server, a mobile computing device, or any other electronic device or computing system capable of receiving, sending, and processing data. In other embodiments, servers 102, 106, and 108 can represent a server computing system utilizing multiple computers as a server system. It should be noted, while three servers are shown in FIG. 1, Computing system event error corrective action recommendation generation environment 100 can have any number of servers (e.g. 1, 2, n . . . n+1). In another embodiment, servers 102, 106, and 108 can be a laptop computer, a tablet computer, a netbook computer, a personal computer, a desktop computer, or any programmable electronic device capable of communicating with other computing devices (not shown) within an environment for computing system event error corrective action recommendation generation environment 100 via network 106.

In another embodiment, servers 102, 106, and 108 represent a computing system utilizing clustered computers and components (e.g., database server computers, application server computers, etc.) that can act as a single pool of seamless resources when accessed within computing system event error corrective action recommendation generation environment 100. Servers 102, 106, and 108 can include internal and external hardware components, as depicted and described in further detail with respect to FIG. 5.

Event error corrective action recommendation engine 104 can be a module for monitoring computing systems, receiving text description of event errors, transforming the event error text description into feature vectors, analyzing the feature vectors, generating an event error diagnosis, and generating a recommendation to correct the event error (described further below). It should be noted, FIG. 1 shows event error corrective action recommendation engine 104 operational on only one computing device, in some embodiments event error corrective action recommendation engine 104 may be operational on one or more computing devices or within a cloud computing system. Event error corrective action recommendation engine 104 may perform some actions described above on the same or different computing systems simultaneously or in sequence.

Network 106 can be, for example, a local area network (LAN), a wide area network (WAN) such as the Internet, or a combination of the two, and can include wired, wireless, or fiber optic connections. In general, network 106 can be any combination of connections and protocols that will support communications between servers 102, 106, and 108.

Figure 2:
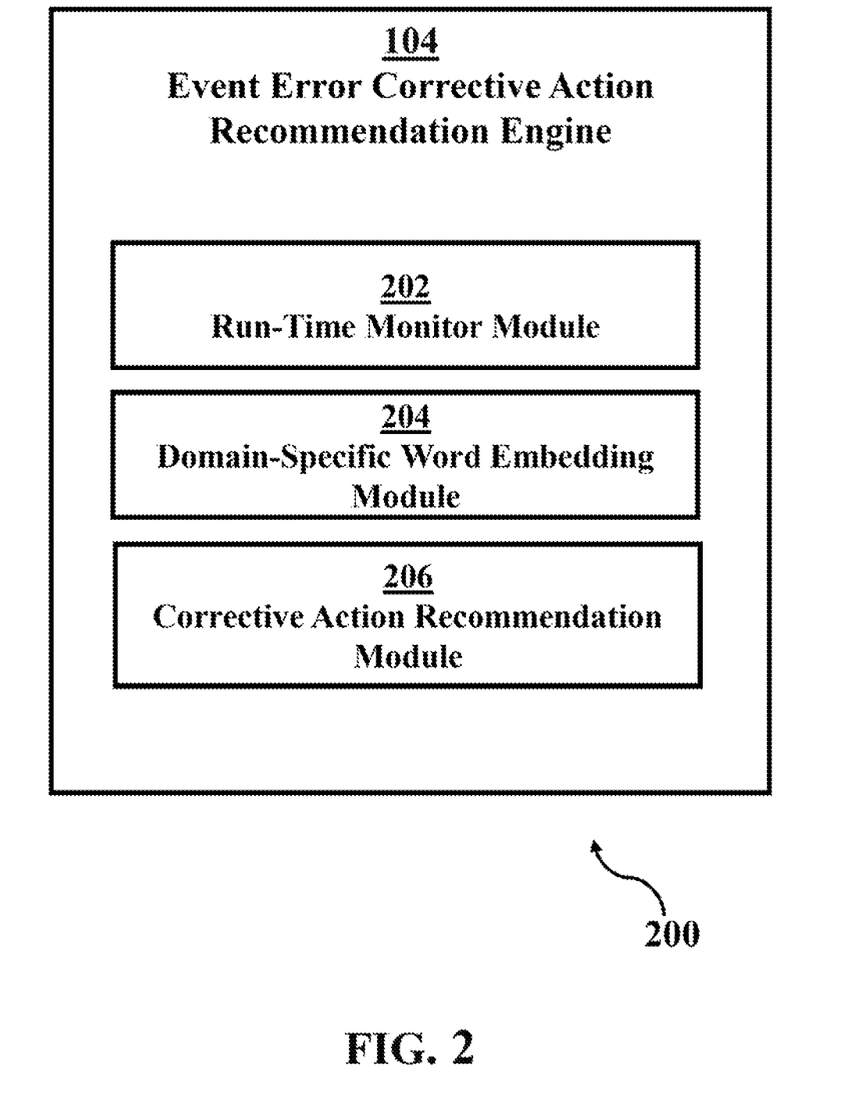
FIG. 2 is a functional block diagram depicting an event error diagnosis engine, in accordance with an embodiment of the present invention.

FIG. 2 is a functional block diagram 200 of event error corrective action recommendation engine 104. Run-time monitor module 202, domain-specific word embedding module 204, and corrective action recommendation module 206 are shown operational within event error corrective action recommendation engine 104.

Run-time monitor module 202 is a computer module capable of monitoring system performance and resource utilization within a computing system, identifying an event error, and generating error descriptions, for example Windows® Task Manager, Top, Htop, vmstat, etc. In some embodiments, run-time monitor module 202 can monitor one or multiple servers. As an example, run-time monitor module can monitor servers 102, 106, and 108 and detect high processor usage within computing system event error corrective action recommendation generation environment 100. Further, if server 108 is experiencing high processor (CPU) usage (e.g. 90% of capacity) run-time monitor module 202 can detect the event. In another example, server 106 may be utilizing a high percentage of the network capacity (e.g. 70%), run-time monitor module 202 can detect this event. In yet another example, an application may be utilizing a high proportion of memory than the historical average (e.g. 28%-35% historical average vs. 68%-75% of utilization during event).

Run-time monitor module 202 can generate an error description for the event error it identifies. An event error may be generated by an application within run-time module 202 for example, PagerDuty, ServiceNow, Etc. Run-time monitor module 202 can have a historical knowledge associated with events and generate error descriptions based on the contextual information of the current event and the historical knowledge of similar occurrences. Contextual information includes the configuration of the server at the time of the error and the description of the error. For example, the operating system, programs in operations, hardware components, power utilization, network configuration, user profiles. Additionally, the text description in the event of high CPU utilization, may be generated as follows, "Program X is using 90% of CPU capacity" Further, the text description and contextual information can be sent to other modules.

Domain-specific word embedding module 204 is a computer module that can receive contextual information and text descriptions of event errors and transform the contextual information and event errors into feature vectors for future processing. Domain-specific word module 204 can have natural language processing capabilities in addition to word-embedding. In an example, a text description and the contextual information of an event error may be received by domain-specific word embedding module 204 and processed by a word embedding model (E.g. Word2Vec, GLoVe, Skip-gram, bag-of-words, etc.) The word embedding model can generate feature vectors from the received text description and contextual information. In some embodiments, the text description and contextual information of the identified event error can be preprocessed using the natural language processing capabilities of domain-specific word embedding module 204 (described in more detail in FIG. 4).

Corrective Action Recommendation module 206 is a computer module that can analyze the feature vectors generated by domain-specific word embedding module 204 and generate a recommendation to correct the event error and present the recommendation to a user for verification. In some embodiments, corrective action recommendation module 206 can be a predictive model that analyzes the feature vectors received from domain-specific word embedding module 204 to predict the most advantageous method of correcting the event error. An example of a model that can be used to predict the cause of an event error is a contextual bandit model. A bandit model is a predictive model with capabilities to exploit known diagnosis of event errors and potentially predict new unknown causes of event errors. In other words, a bandit model can identify an optimal corrective action from a scripted list of corrective actions for the event error, while continuing to explore the other recommendation options. The arms of the bandit can be illustrated as follows:

$$A = \{a^{(1)}, a^{(2)} \ldots a^{(N)}\}$$

where A is the set of arms and $a^{(N)}$ denotes the scripted resolutions within the diagnosis system. Arms can be the recommendation for corrective action of an event error. For example, in a high CPU usage scenario there may be four potential scripted corrective actions: 1) delete files
2) restart services,
3) kill processes,
4) execute antivirus process.

The contextual information (system configuration and textual description) can be represented as a feature vector as follows:

$$x_t \in X$$

where x is the feature vector at time t and X is the d-dimensional feature space. For the bandit model, every recommended corrective action can be represented as follows:

$$(a^{(i)} = \pi(x_t)) \in A$$

In some embodiments, the total reward for a recommended corrective action can be represented as follows:

$$R_\pi = \sum_{t=1}^{T} r_{\pi(x_t)}$$

where R is the total reward received by policy π, for the corresponding feedback $r_{\pi(x_t)}$ indicating whether the problem has been successfully resolved.

An example of an equation that can be used to maximize the explore/exploit prediction dilemma is as follows:

$$\pi^* = \underset{\pi}{\mathrm{argmax}}\, E(R_\pi) = \underset{\pi}{\mathrm{argmax}} \sum_{t=1}^{T} E(r_{\pi(x_t)} | t)$$

where π* is the optimal policy for maximizing total reward (correct prediction) after T iterations.

In some embodiments, the contextual bandit model can be optimized by a variety of methods. These methods may include, but are not limited to, linear regression gradient descent, and particle swarm optimization. Particle swarm optimization is an approach which finds the best solution for a particle (i.e. arm) by iteratively updating each particle using its best one and global particle, thus resulting in the finding the best hyperparameters for the contextual bandit model.

For ease of understanding the following explanation, the following definitions are provided. A particle is a solution position in the solution space (i.e. hyper parameters). A particle position is the current solution position in the solution space. Particle velocity is the solution improvement. P-best is the local best solution in the solution space. G-best is the global best solution in the solution space. An example of a particle swarm optimization calculation for each arm of the contextual bandit model can be the following fitness function:

$$f(\cdot) = \sum_{t=1}^{T} p(r_{k,t} | \mathcal{P}_k^t, x_t, r_{t\_obs} = 1)$$

the particle $\mathcal{P}_k$ is a set of hyper parameters $\{\alpha_k, \beta_k, \mu_{\theta_k}, \Sigma_{\theta_k}\}$, where $\mu_{\theta_k}$ is a d-dimensional vector and $\Sigma_{\theta_k}$ is a d×d diagonal matrix.

In some embodiments, the bandit model hyperparameters can be updated dynamically in the following manner, corrective action recommendation module 206 receives feature vector $x_t$ at time T from domain specific word embedding module 204 and performs the following actions. Initialize the kth particles $\mathcal{P}_{k,0}$ and velocity $V_{\mathcal{P}_{k,0}}$. A reward prediction $\hat{r}_{k,t}$ can be made for particle $\mathcal{P}_{k,t}$ based on $x_t$ and selection policy (e.g. Thompson sampling or LinUCB). An evaluation of the fitness function can be made where if fitness $\mathcal{P}_{k,t} > \mathcal{P}_{k_{Best},t}$ and $\mathcal{P}_{k,t} > \mathcal{P}_{G_{Best},t}$, the hyper parameters Velocity $V_{\mathcal{P}_{k,t}}$ and Position $\mathcal{P}_{k,t}$ of the arm can be updated.

In an embodiment, the generated recommendation may be presented to a user through a Graphical User Interface or other suitable medium, for verification by corrective action recommendation module 206. In another embodiment, the recommendation may be presented to an expert system for verification. An expert system can be an artificial intelligence system capable of making decisions based on an event error knowledge base and/or programmed rules-based inferences. It should be noted, while the examples below state the recommendation is presented to a user for verification, this is for simplicity, it should be recognized in the following examples the recommendation can also be presented to an expert system for verification. For example, in a high CPU usage event error, the recommendation to correct the issue may be a system reboot. The user may verify this recommendation. In some embodiments, corrective action recommendation module 206 can execute the verified action. However, in some other embodiments, there may be multiple options presented to the user with the likelihood of correcting the issue. For example, in a High CPU usage error there may be a message showing rebooting the system has a 75% chance of correcting the event error and executing antivirus program may have a 25% chance of correcting the event error. If the user chooses to execute the antivirus program this choice will be used to update the hyper parameters within the contextual bandit model. Additionally, corrective action recommendation module 206 may execute the antivirus software.

Figure 3:
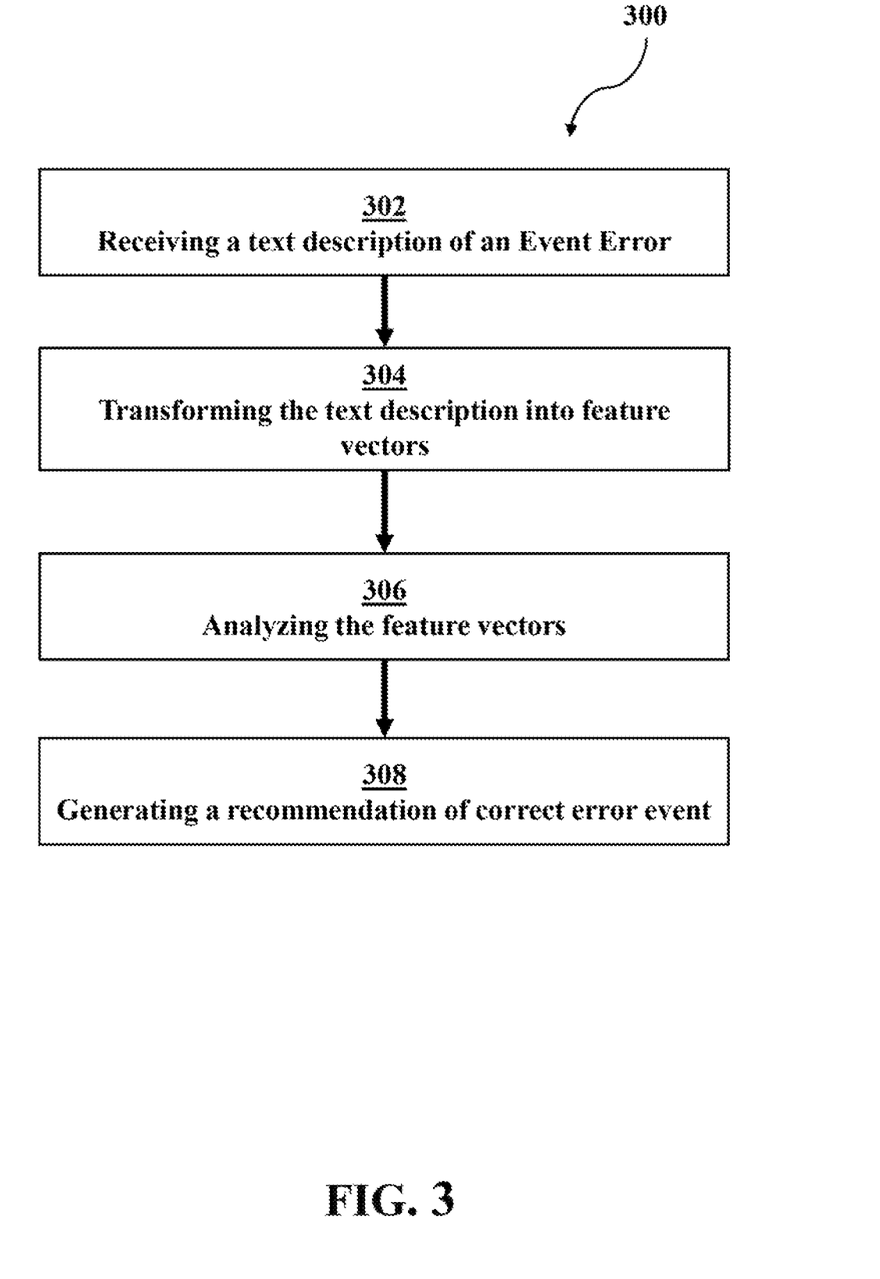
FIG. 3 is a flowchart depicting operational steps of a method for computing system event error diagnosis, in accordance with an embodiment of the present invention.

FIG. 3 is a flowchart depicting operational steps of a method for detecting an event error and generating a recommendation to correct the event error using artificial intelligence. At step 302, terms can be extracted from a domain specific corpus by term extraction module 202. In some embodiments, the event error may be from a system monitoring module with a historical knowledge to generate error descriptions and record the system configurations at the time of the event error. In other embodiments, the run-time monitor module 202 can be operational within the event error diagnosis engine 104 and generate the text description of the event error.

Figure 4:
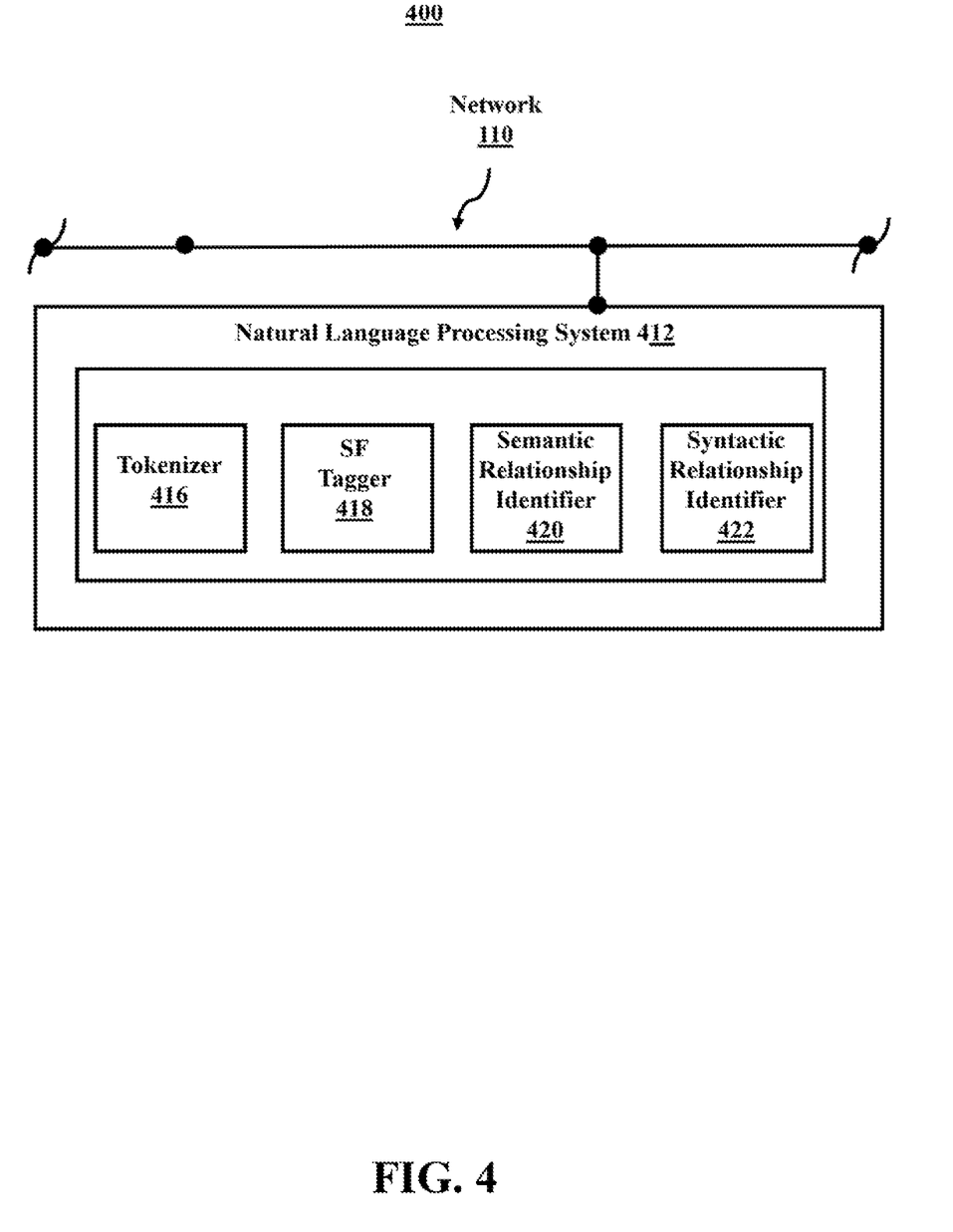
FIG. 4 is a functional block diagram of an exemplary natural language processing system configured to receive event error text descriptions, in accordance with an embodiment of the present invention.

At step 304, the text description of the event error is transformed into a feature vector by domain-specific word embedding module 204. In an embodiment, run-time monitor module can send the text description to word embedding module 204. Further, in other embodiments, natural language processing system 412 can preprocess the event error text description for domain specific word embedding module 204. Additionally, in embodiments where natural language processing system 412 is a stand-alone system, rather than a module within event-error diagnosis engine 104 natural language processing system can send the preprocessed event error textual description information to domain-specific word embedding module via network 110.

At step 306, corrective action recommendation module 206 can analyze the feature vectors generated by word embedding module 204. Corrective action recommendation module 206 can analyze the feature vectors using any suitable model for example, corrective action recommendation module 206 can analyze the feature vectors of a high CPU usage event error, with a contextual bandit model optimized using particle swarm optimization. As a non-limiting example, the bandit model may have four scripted responses to a high CPU usage event error, 1) delete files, 2) restart services, 3) kill processes, or 4) execute antivirus process, which are considered in the analysis.

At step 308, corrective action recommendation module 206 can generate a recommendation to correct the event error, based on the analysis of the feature vectors generated by word embedding module 204. In an embodiment, corrective action recommendation module 206 can have a recommendation prediction model, such as a contextual bandit model and preprogrammed responses to the detected event errors. The recommended corrective action to the event error can be the most likely to correct the action or the action resulting the least downtime of a server computer 102, 106, 108, in light of the context surrounding the event error. Further, in an embodiment, the recommended response can be an optimized recommendation based on a context bandit model optimized using particle swarm optimization model.

FIG. 4 is an exemplary natural language processing system configured to receive event error text descriptions and transform the event error text descriptions into feature vectors, in accordance with an embodiment of the invention. Natural language processing system may be operational within event error diagnosis engine 104 or it may be a stand-alone system in communication with event error diagnosis engine 104 via network 110. In some embodiments, a system monitor or run-time monitor module 202 may submit an event error text description to be analyzed by the natural language processing system 412. Additionally, natural language processing system 412 can send the preprocessed event error text description domain-specific word embedding module 206.

Consistent with various embodiments, the natural language processing system 412 may process event error text descriptions sent by run-time monitor module 202. Specifically, the natural language processing system 412 may preprocess event error text descriptions. The natural language processing system 412 may perform various methods and techniques for analyzing event error text descriptions (e.g., syntactic analysis, semantic analysis, etc.). The natural language processing system 412 may be configured to recognize and analyze any number of natural languages. In some embodiments, natural language processing system 412 may group one or more sections of event error text descriptions into one or more subdivisions. Further, natural language processing system 412 may include various modules to perform analyses of event error text descriptions. These modules may include, but are not limited to, a tokenizer 416, a syntactic function (SF) tagger 418 (e.g., which may tag each of the one or more sections in which the particular subject is identified), a semantic relationship identifier 420, and a syntactic relationship identifier 422.

In some embodiments, the tokenizer 416 may be a computer module that performs lexical analysis. The tokenizer 416 may convert a sequence of characters into a sequence of tokens. A token may be a string of characters included in a recording and categorized as a meaningful symbol. Further, in some embodiments, the tokenizer 416 may identify word boundaries in a recording and break any text within the event error text descriptions into their component text elements, such as words, multiword tokens, numbers, and punctuation marks. In some embodiments, the tokenizer 416 may receive a string of characters, identify the lexemes in the string, and categorize them into tokens.

Consistent with various embodiments, the SF tagger 418 may be a computer module that marks up a word in an event error text description to correspond to the syntactic function of the word. The SF tagger 418 may read a passage or other text in natural language and assign a syntactic function to each word or other token. The SF tagger 418 may determine the syntactic function to which a word corresponds based on the definition of the word and the context of the word. The context of a word may be based on its relationship with adjacent and related words in a phrase, sentence, or paragraph. In some embodiments, the context of a word may be dependent on one or more previously analyzed event error text descriptions. Examples of parts of syntactic function that may be assigned to words include, but are not limited to, nouns, verbs, adjectives, adverbs, and the like. Examples of other syntactic function categories that SF tagger 418 may assign include, but are not limited to, comparative or superlative adverbs, wh-adverbs, conjunctions, determiners, negative particles, possessive markers, prepositions, wh-pronouns, and the like. In some embodiments, the SF tagger 418 may tag or otherwise annotate tokens of an event error text description with syntactic function categories. In some embodiments, the SF tagger 418 may tag tokens or words of an event error text description to be parsed by the natural language processing system 412.

In some embodiments, the semantic relationship identifier 420 may be a computer module that may be configured to identify semantic relationships of recognized subjects (e.g., words, phrases, images, etc.) in an event error text description. In some embodiments, the semantic relationship identifier 420 may determine functional dependencies between entities and other semantic relationships.

Consistent with various embodiments, the syntactic relationship identifier 422 may be a computer module that may be configured to identify syntactic relationships in an event error text description composed of tokens. The syntactic relationship identifier 422 may determine the grammatical structure of sentences such as, for example, which groups of words are associated as phrases and which word is the subject or object of a verb. The syntactic relationship identifier 422 may conform to formal grammar.

Figure 5:
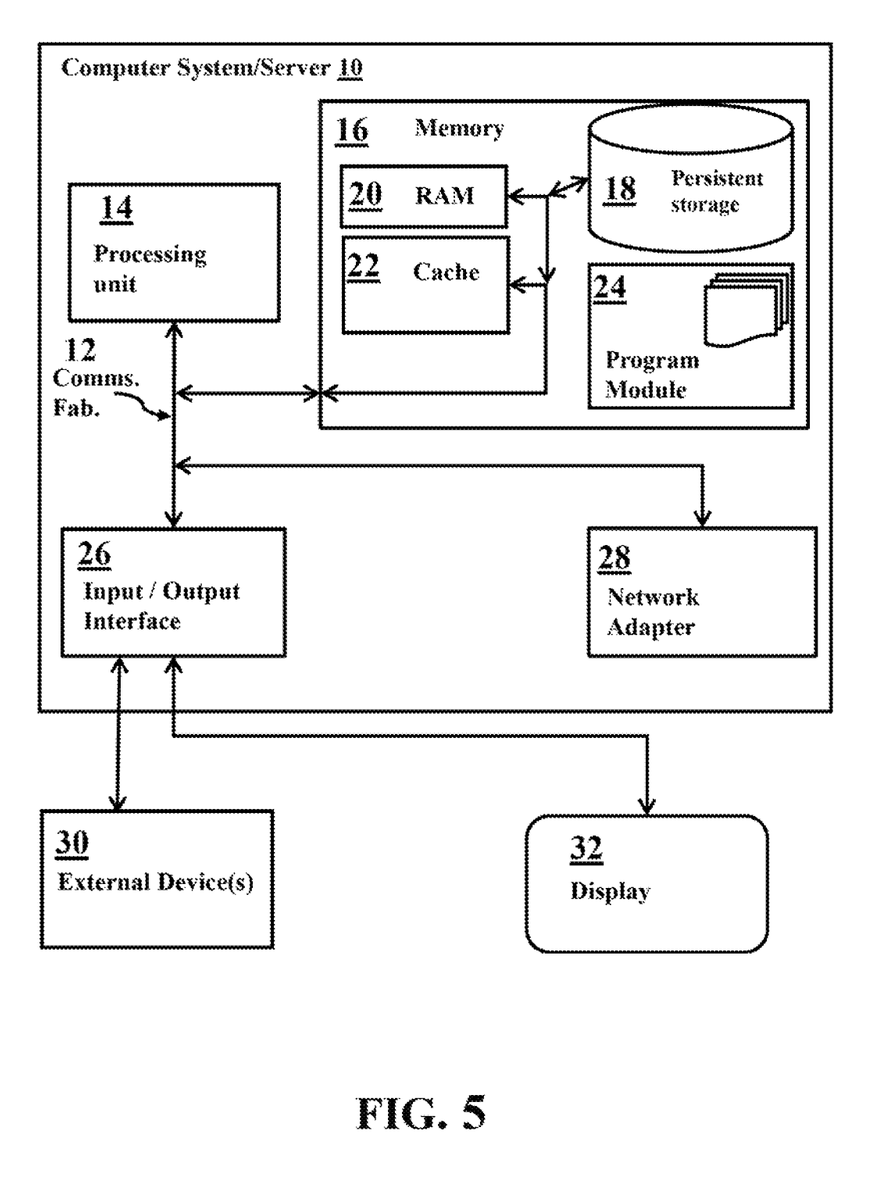
FIG. 5 is a functional block diagram of an exemplary computing system within a computing system event error diagnosis environment, in accordance with an embodiment of the present invention.

FIG. 5 depicts computer system 10, an example computer system representative of a dynamically switching user interface computer 10. Computer system 10 includes communications fabric 12, which provides communications between computer processor(s) 14, memory 16, persistent storage 18, network adaptor 28, and input/output (I/O) interface(s) 26. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses.

Computer system 10 includes processors 14, cache 22, memory 16, persistent storage 18, network adaptor 28, input/output (I/O) interface(s) 26 and communications fabric 12. Communications fabric 12 provides communications between cache 22, memory 16, persistent storage 18, network adaptor 28, and input/output (I/O) interface(s) 26. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses or a crossbar switch.

Memory 16 and persistent storage 18 are computer readable storage media. In this embodiment, memory 16 includes random access memory (RAM). In general, memory 16 can include any suitable volatile or non-volatile computer readable storage media. Cache 22 is a fast memory that enhances the performance of processors 14 by holding recently accessed data, and data near recently accessed data, from memory 16.

Program instructions and data used to practice embodiments of the present invention may be stored in persistent storage 18 and in memory 16 for execution by one or more of the respective processors 14 via cache 22. In an embodiment, persistent storage 18 includes a magnetic hard disk drive. Alternatively, or in addition to a magnetic hard disk drive, persistent storage 18 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 18 may also be removable. For example, a removable hard drive may be used for persistent storage 18. Other examples include optical and magnetic disks, thumb drives, and smart cards that are inserted into a drive for transfer onto another computer readable storage medium that is also part of persistent storage 18.

Network adaptor 28, in these examples, provides for communications with other data processing systems or devices. In these examples, network adaptor 28 includes one or more network interface cards. Network adaptor 28 may provide communications through the use of either or both physical and wireless communications links. Program instructions and data used to practice embodiments of the present invention may be downloaded to persistent storage 18 through network adaptor 28.

I/O interface(s) 26 allows for input and output of data with other devices that may be connected to each computer system. For example, I/O interface 26 may provide a connection to external devices 30 such as a keyboard, keypad, a touch screen, and/or some other suitable input device. External devices 30 can also include portable computer readable storage media such as, for example, thumb drives, portable optical or magnetic disks, and memory cards. Software and data used to practice embodiments of the present invention can be stored on such portable computer readable storage media and can be loaded onto persistent storage 18 via I/O interface(s) 26. I/O interface(s) 26 also connect to display 32.

Display 32 provides a mechanism to display data to a user and may be, for example, a computer monitor or virtual graphical user interface.

The components described herein are identified based upon the application for which they are implemented in a specific embodiment of the invention. However, it should be appreciated that any particular component nomenclature herein is used merely for convenience, and thus the invention should not be limited to use solely in any specific application identified and/or implied by such nomenclature.

The present invention may be a system, a method and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems) and computer program products according to embodiments of the invention. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality and operation of possible implementations of systems, methods, and computer program products according to various embodiments of the present invention. In this regard, each block in the flowchart or block diagrams may represent a module, segment or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
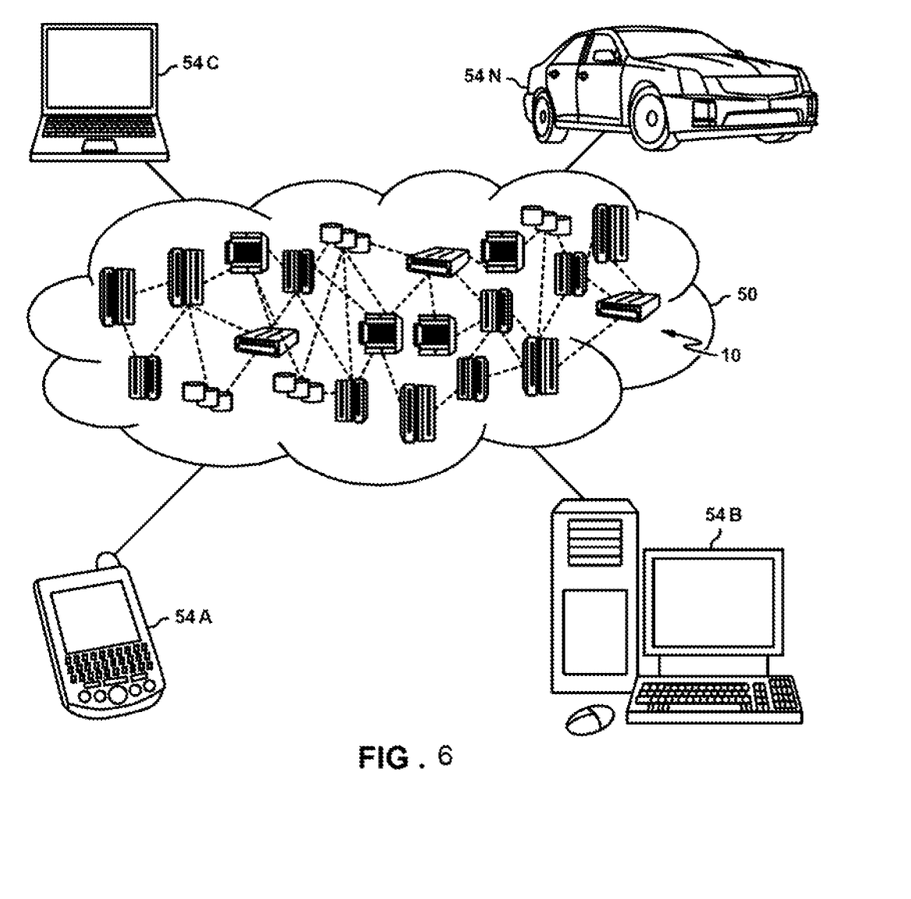
FIG. 6 is a diagram depicting a cloud computing environment, in accordance with an embodiment of the present invention.

FIG. 6 is a block diagram depicting a cloud computing environment 50 in accordance with at least one embodiment of the present invention. Cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
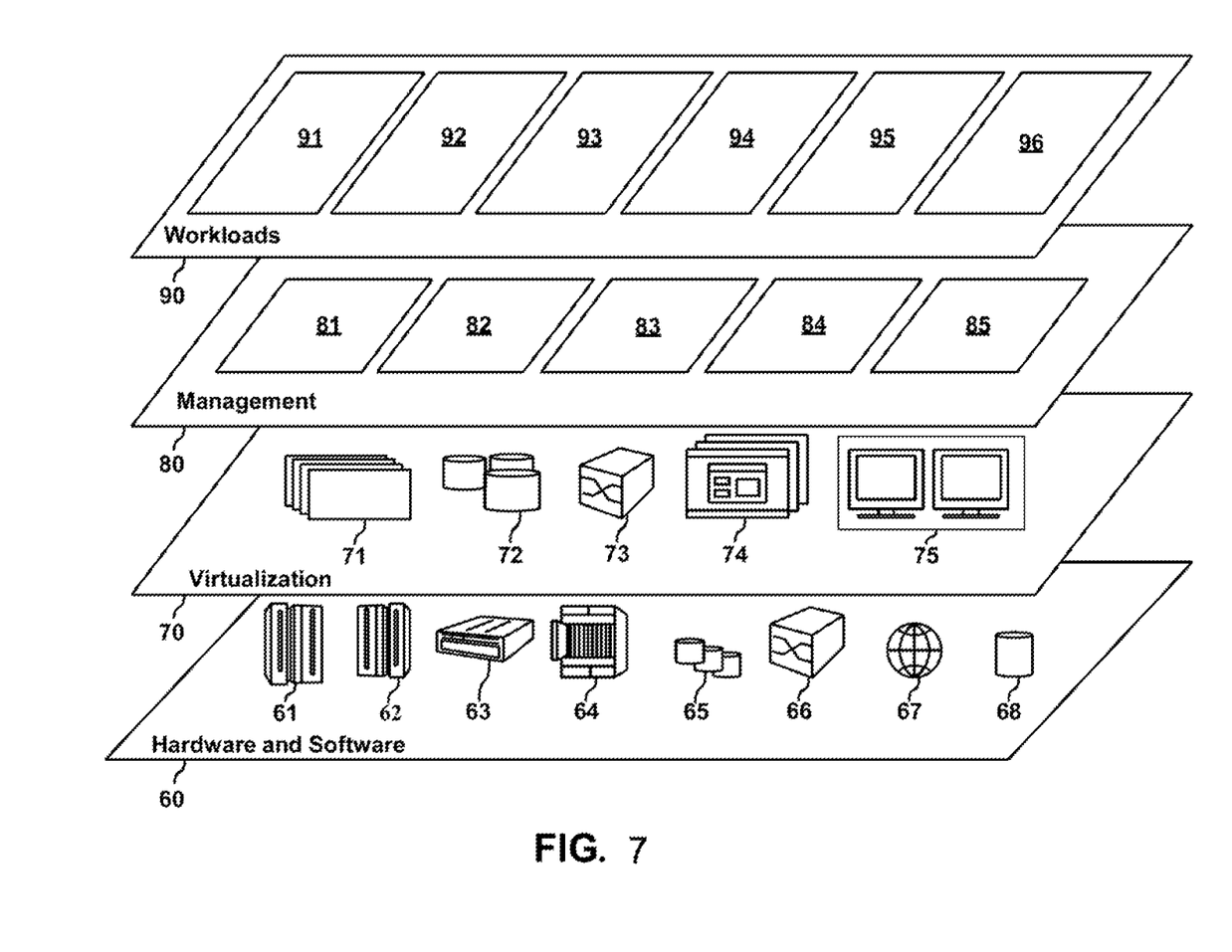
FIG. 7 is a functional block diagram depicting abstraction model layers, in accordance with an embodiment of the present invention.

FIG. 7 is a block diagram depicting a set of functional abstraction model layers provided by cloud computing environment 50 depicted in FIG. 6 in accordance with at least one embodiment of the present invention. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and event error corrective action generation 96.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for generating a corrective action recommendation to a computing system event error, the computer implemented method comprising:

transforming, by a processor, a textual description of an event error into feature vectors, wherein the event error is a computing system error;

analyzing the feature vectors;

generating a recommendation to correct the event error, based on analyzing the feature vectors, wherein the recommendation to correct the event error is generated by a contextual bandit model; and correcting the event error, based on the generated recommendation, wherein the correction is performed by an expert system.

2. The computer-implemented method of claim 1, further comprising:

monitoring the computing system;

detecting the event error; and
generating the textual description of the event error.

3. The computer-implemented method of claim 1, wherein the transforming the textual description into feature vectors is performed by a word embedding model.

4. The computer-implemented method of claim 1, further comprising:
presenting the recommendation for verification.

5. The computer-implemented method of claim 2, wherein the textual description contains contextual information of the event error.

6. The computer-implemented method of claim 1, wherein the contextual bandit model is optimized by a particle swarm optimization model.

7. A computer system for diagnosing a computing system error, the system comprising:
one or more computer processors;
one or more computer readable storage media;
computer program instructions to:
transform the textual description of an event error into feature vectors, wherein the event error is a computing system error;
analyze the feature vectors;
generate a recommendation to correct the event error based on analyzing the feature vectors, wherein the recommendation to correct the event error is generated by a contextual bandit model; and
correct the event error, based on the generated recommendation, wherein the correction is performed by an expert system.

8. The computer system of claim 7, further comprising:
monitor the computing system;
detect the event error; and
generate the textual description of the event error.

9. The computer system of claim 7, wherein the transforming the textual description into feature vectors is performed by a word embedding model.

10. The computer system of claim 7, further comprising:
present the recommendation for verification.

11. The computer system of claim 8, wherein the textual description contains contextual information of the event error.

12. The computer-implemented method of claim 7, wherein the contextual bandit model is optimized by a particle swarm optimization model.

13. A computer program product for optimizing system migration to a cloud, the computer program product comprising one or more computer readable storage media and program instructions sorted on the one or more computer readable storage media, the program instructions including instructions to:
transform the textual description of an event error into feature vectors, wherein the event error is a computing system error;
analyze the feature vectors;
generate a recommendation to correct the event error based on analyzing the feature vectors, wherein the recommendation to correct the event error is generated by a contextual bandit model; and
correct the event error, based on the generated recommendation, wherein the correction is performed by an expert system.

14. The computer program product of claim 13:
monitor the computing system;
detect the event error; and
generate the textual description of the event error.

15. The computer program product of claim 13:
wherein the transforming the textual description into feature vectors is performed by a word embedding model.

16. The computer program product of claim 13, further comprising instructions to:
present the recommendation for verification.

17. The computer program product of claim 13, wherein the contextual bandit model is optimized by a particle swarm optimization model.

* * * * *